No. 656,563. Patented Aug. 21, 1900.
W. H. MYERS.
PISTON PACKING RING.
(Application filed Dec. 21, 1899.)
(No Model.)
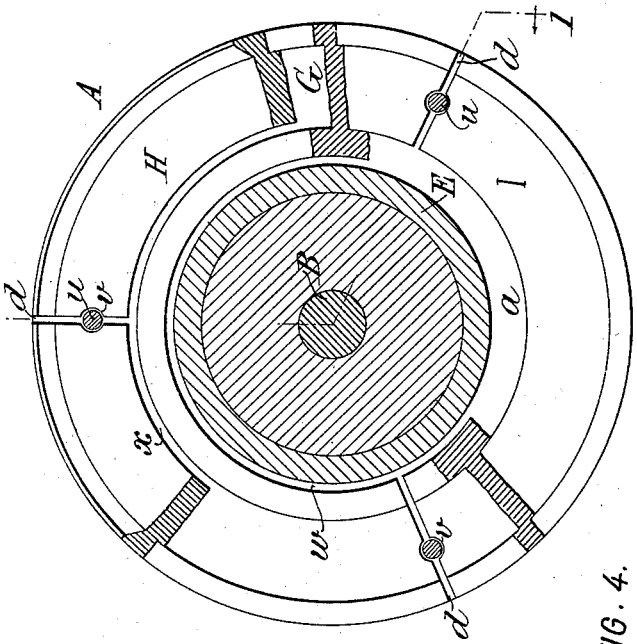
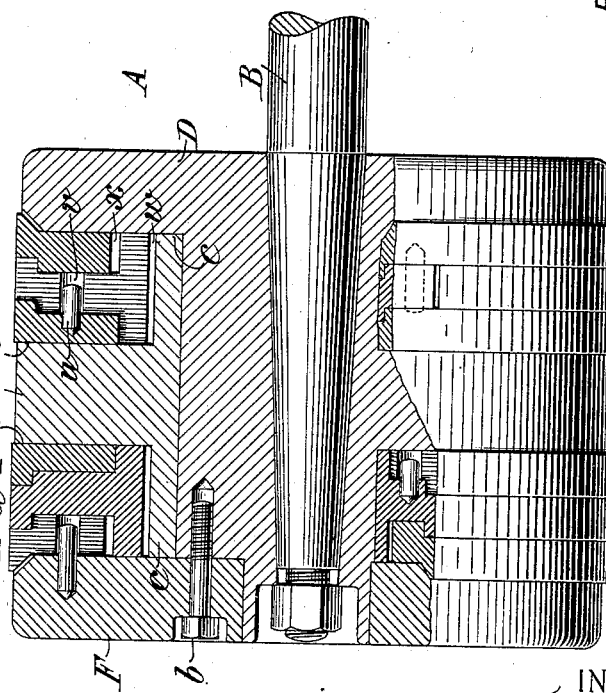
WITNESSES:
Fred White
Thomas F. Wallace
INVENTOR:
William H. Myers,
By Attorneys,

UNITED STATES PATENT OFFICE.

WILLIAM H. MYERS, OF NEW YORK, N. Y.

PISTON PACKING-RING.

SPECIFICATION forming part of Letters Patent No. 656,563, dated August 21, 1900.

Application filed December 21, 1899. Serial No. 741,114. (No model.)

*To all whom it may concern:*

Be it known that I, WILLIAM H. MYERS, a citizen of the United States, residing in the city of New York, borough of Brooklyn, county of Kings, and State of New York, have invented certain new and useful Improvements in Piston and other Packing-Rings, of which the following is a specification.

This invention relates to packing-rings for pistons and aims to provide certain improvements therein.

In endeavoring to make a tight joint between a piston and its cylinder it has been common to mount two split rings on the piston in such manner that there will be freedom for the rings to play in and out sufficiently to follow any variations in the walls of the cylinder, the space inwardly of the rings for permitting this play serving as a steam-chamber in which the expansion of the steam may be utilized to keep the rings constantly pressed against the cylinder with the desired pressure for making a tight joint. Such rings have been assembled with their divided portions staggered, so that the solid part of one ring shall close the slit of the other, and the one has been provided with a flange entering the other for holding the two in correct relation in the ring-groove formed between the spider-plate and bull-ring or the bull-ring and the follower-plate of a piston.

My present improvements are especially applicable to what are known as "double-ring" packings—that is, those best adapted for pistons provided with two packing-grooves and carrying two sets of packing-rings, the one set being active when steam-pressure exists at the side of the piston adjacent to it and the other set being then passive, the packings operating alternately with successive strokes of the piston. My improvements, however, are not confined to this use and may be generally employed advantageously; but for convenience I will describe such an application of my invention.

My invention aims to provide a packing-ring which while composed of a plurality of split rings shall be simple, convenient, and strong of construction, easily assembled, leak-tight, and in which the several rings shall wear uniformly, and thus insure a leak-tight construction throughout the life of the packing. To this end in carrying out my invention in its preferred form I utilize three distinct rings, each having wearing-faces of equal area, the one constituting a main ring, another constituting what may be called a "check-ring," and another constituting the initial ring. The main ring carries the other two, the one engaging it so closely as to seal the packing and the other engaging it yieldingly, the latter and the main ring being preferably both subject to expansion under steam-pressure to give the requisite pressure against the cylinder.

In the accompanying drawings, which show the preferred form of my invention, Figure 1 is a side elevation, partly in longitudinal section, on the lines 1 1 of Fig. 2, of a piston equipped with double-ring packings; and Fig. 2 is a transverse section thereof cut on the planes of the lines 2, $2^a$, and $2^b$ of Fig. 1, so as to show fragments of the initial ring, the main ring, and the sealing-ring in elevation; and Figs. 3, 4, and 5 show details.

Referring to the drawings, let A indicate the piston, B its rod, and C C the packing-rings. The piston A may be of any construction and may be any member adapted to withstand pressure in a cylinder. The piston shown comprises a spider-plate D, a bull-ring E, and a follower-plate F and is provided with the usual grooves $a$ on its periphery between these parts. The bull-ring is slightly larger in diameter than the plate and follower, so as to guide the piston in a cylinder. The follower is drawn up in any suitable manner, as by bolts $b$, so that the flanges $c$ of the bull-ring make tight joints with the opposing faces of the spider and follower in the construction shown. The packing-rings C are mounted in the grooves $a$, being sprung into these grooves when the piston is formed of a solid piece with turned grooves and being placed on the bull-ring and assembled with the latter when the piston is made up of several pieces, as shown.

According to my present invention I provide an improved construction for the packing-ring, which I preferably form of three rings G, H, and I. Each is split, preferably, at only one point $d$, and the three when assembled suitably fit one of the grooves $a$. The ring G is the main ring carrying the other two and in cross-section has a body or web e, an outer cylinder-face f, preferably staggered to offset it slightly from the body, and an inner base g, having projecting flanges h and i on opposite sides of the body. Near its outer edge the body has an internal shoulder j opposite the flange h, and on its opposite side it has an external shoulder k. The ring H has a body l of the same width as the body e, but of less depth, having a bottom face m opposite and spaced slightly from the flange h, a top shoulder n opposite and fitting the shoulder j, and an outer bearing-face o of the same width as the face f. The front edge p of the ring overhangs its body and may be beveled, as shown. The ring I has a body q of the same depth as the body e, an inner face r fitting on the flange i, an internal shoulder s fitting over the shoulder k, and an outer bearing-face t of the same width as the face f. Each ring carries diametrically opposite its slit a stud u, which loosely engages a socket v in the slit of the adjacent ring for preserving the rings in correct position, with their slits staggered, one of the outer rings being held in position by a similar stud carried by an adjacent part of the piston. The three rings when assembled fit their groove, so that they can easily expand and contract and move therein to follow the cylinder. Their dimensions relatively to the groove are such that a steam-chamber w is formed beneath the main ring and a steam-chamber x beneath the initial ring. The side faces of the rings are approximately flat, so that when pressure enters around the piston and forces the three rings against the flat inner face of the groove carrying them the flat sides of the ring I and the adjacent flange i will make a tight joint against the wall of the groove. The steam can work down between the other wall of the groove and the rings and through the slit in the first ring H with sufficient freedom to expand the rings against the cylinder. In doing this it forces ring G against ring I with such intimacy that leakage between these rings is avoided and leakage between the ring I and flange i and the wall of the groove is avoided. The ring I, snugly fitting the flange i and the shoulder k, prevents any steam from running around between the two from the slit in the ring G to the slit in the ring I, and this makes a perfect seal against the wall of the cylinder, across which no leakage can pass. The ring H contracts freely on the ring G for following the cylinder and assists in checking cross-flow of steam at all points except its own slit, which in turn is blocked by the solid body of the ring G, the slit of which latter is sealed by the ring I.

It will be noted that the faces of the three rings are of equal area, so that wear of each will be equal, thus preventing the undue wear of one from opening a leak-crevice between it and another. It will also be noted that the effective area for the expansive action of the steam confined in the groove is so proportioned that an approximately-uniform surface pressure on all the rings will be obtained, the flange of the ring G equaling in its unbalanced area approximately the surface faces f and t, while the face n of the ring H has the same relative area as has its face m, the area of which is approximately half the effective area of the ring G.

In operation the rings will yield and expand according to variations in pressure and imperfections in a cylinder. They will wear evenly and prevent leakage. They can be easily assembled and removed and cannot be incorrectly located. One set of rings will prevent leakage in one direction and be passive in another direction of movement of the piston.

The interengaging faces or provisions j and n on the rings H and G will prevent the ring H from dropping too far out in case it passes entirely over the counterbore, which is sometimes extended into the cylinder far enough to be passed by the outer packing-ring. The similar provisions on the rings G and I will have the same effect as to the ring G. It will be noted that while the ring G permits free compression of the ring H it limits its expansion for the purpose stated.

The cross-sections of the three differential rings are shown separately in Figs. 3, 4, and 5. The flat side faces $a'$ $b'$ of the ring G make contact with the flat side faces $a''$ $b''$ of the rings H and I, respectively. The side face $c'$ of the ring H coincides with the width of the flange h of the ring G, and the side face $d'$ of the ring I coincides with the width of the flange i of the ring G.

It will be seen that my invention provides improvements which can be readily and advantageously availed of, and it will be understood that I do not limit myself to the exact features of construction, arrangement, use, or combination set forth as constituting the preferred form of my invention, since my improvements can be employed in whole or in part, as circumstances or the judgment of those skilled in the art may dictate, without departing from the spirit of my invention.

What I claim is—

1. In packings, the combination with a piston having a peripheral groove, of a packing-ring in said groove consisting of a plurality of expansive rings each having a subdividing slit, that of one ring staggered in position relatively to that of an adjacent ring, one of said rings having a body, a projecting flange, an outer bearing-face, and an inner bearing-face, and the other of said rings having a body fitting against the body of said first-mentioned ring, a shoulder passing under the flange thereof, and a flange passing under and making intimate contact with the inner side thereof, substantially as and for the purpose set forth.

2. In packings, a piston having a peripheral groove, in combination with a packing-ring in said groove consisting of a plurality of split rings, one having a body $e$, a bearing-face $f$ staggered relatively thereto, a shoulder $j$, and a projecting flange at its inner side, and the other having a body having a shoulder engaging said shoulder, an outer bearing-face, and an inner face opposite said projecting flange.

3. The combination with a piston having a peripheral groove, of a packing-ring consisting of a plurality of expansive split rings, the intermediate one having a body, and laterally-projecting flanges, and the side ones fitting against opposite sides of said body outwardly of said flange, said rings having respectively outer bearing-faces of approximately-uniform area, and interengaging provisions on two of said rings limiting expansion of one of the side rings relatively to the center ring.

4. For packings, a piston having a peripheral groove, in combination with a packing-ring consisting of three expansive rings, the one having a central body and projecting flanges, and the others fitting against opposite sides of the first, said rings each having a subdividing slit staggered in position relatively to that of the adjacent ring, and two of said rings having each an outer bearing-face staggered relatively to its body.

5. In packings, a piston having a peripheral groove, in combination with a packing-ring consisting of three expansive rings G, H and I, the ring G having a body $e$, outer face $f$, internal shoulder $j$, and inner face $g$, the ring H fitting within the shoulder $j$ of the ring G, and having outer face $o$ and inner face $m$, and the ring I fitting against the opposite side of the ring G, and having inner face $r$ fitting against the adjacent flange of the ring G.

6. For expansive packings, the improved ring G having body $e$, flanges $h$ $i$, bearing-face $f$, and internal shoulder $j$, and rings fitting against the opposite sides of said ring G.

7. For packings, the improved ring H having bearing-face $o$, shoulder $n$, flat side walls, and inner face $m$ adapted to fit within a reciprocal ring, in combination with such reciprocal ring.

8. The improved ring-packing consisting of the split rings G, H and I, the ring G having lateral flanges $h$ and $i$, and the rings H and I fitting against opposite sides of the ring G outwardly of said flanges, and means limiting the outward expansion of one of said side rings relatively to said ring G.

In witness whereof I have hereunto signed my name in the presence of two subscribing witnesses.

WILLIAM H. MYERS.

Witnesses:
GEORGE H. FRASER,
THOMAS F. WALLACE.